E. THOMAS.
NUT LOCK.
APPLICATION FILED JULY 29, 1915.
1,176,791. Patented Mar. 28, 1916.
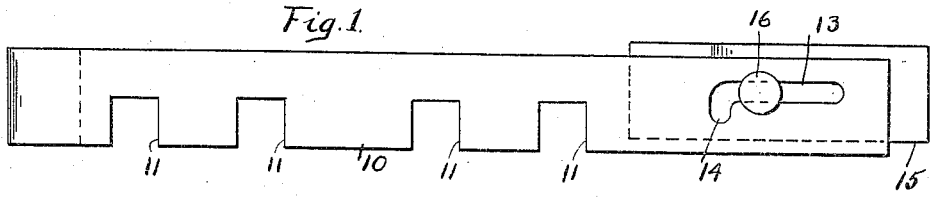
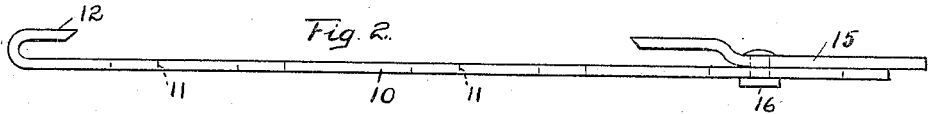
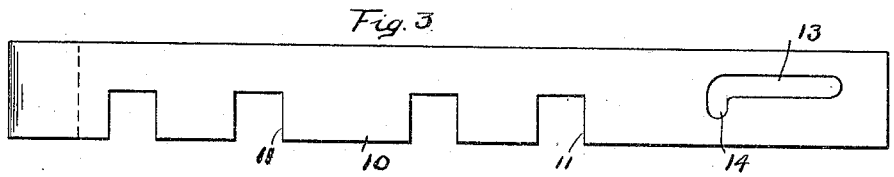
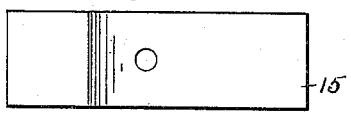 
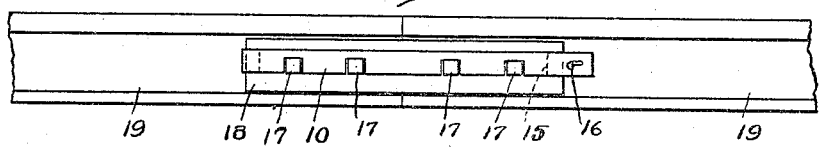
INVENTOR.
Emanuel Thomas
BY Taylor & Hulse
ATTORNEYS.

UNITED STATES PATENT OFFICE.

EMANUEL THOMAS, OF LIBERTY MILLS, INDIANA, ASSIGNOR OF ONE-THIRD TO GIDEON HEETER AND ONE-THIRD TO GEORGE STRICKLER, BOTH OF NORTH MANCHESTER, INDIANA.

NUT-LOCK.

1,176,791.   Specification of Letters Patent.   Patented Mar. 28, 1916.

Application filed July 29, 1915.   Serial No. 42,497.

*To all whom it may concern:*

Be it known that I, EMANUEL THOMAS, a citizen of the United States, residing at Liberty Mills, in the county of Wabash and State of Indiana, have invented new and useful Improvements in Nut-Locks, of which the following is a specification.

The invention relates to nut-locks.

The object of the invention is to provide a cheap and simple device which may be easily and quickly applied to nuts of various kinds and uses for effectively locking them on the bolts upon which they are engaged, the device being readily removable when desired.

The invention consists in the novel combination of parts hereinafter described and illustrated in the drawings in which drawings—

Figure 1 is a plan view of a device according to the invention. Fig. 2 is a side or edge view of the same. Fig. 3 is a plan view of the tie bar. Fig. 4 is a plan view of the adjustable jaw. Fig. 5 is an edge view of the same. Fig. 6 is a side elevational view of portions of two rails illustrating the application of the invention thereto.

Referring to the drawings, which illustrate but one application of the invention, it being understood that the device may be used to lock one or more nuts on bolts in various other articles, such as in threshing machines, the lock consists of a bar 10 having any desired number of notches 11 cut into one longitudinal edge, the notches being of sufficient size to enable the nuts to be locked to readily pass into them and not permit the nuts to rotate. One end of the bar is bent back to form a jaw or hook 12. The other end of the bar is provided with a slot 13. One end of the slot, preferably the inner end, is enlarged to provide a notch 14. A jaw or hook 15 is movably secured to the latter end of the bar by a bolt or rivet 16 which is engaged in slot 13. The inner end of jaw 15 flares outwardly to correspond to hook 12. The jaw 15 is, therefore, adjustable on bar 10 so that hook 12 may be first engaged over one edge or end of the part through which the bolt or bolts pass and when thus engaged the bar is rocked toward the bolt or bolts until the nut or nuts thereon engage in notch or notches 11. Whereupon hook 15 is slid along bar 10 until its attaching bolt or rivet 16 drops or is moved into notch 14. A nut may then be tightened on bolt 16 or the head of the rivet may be swaged against bar 10.

In Fig. 4 the bar is applied to lock nuts 17 which are placed on the usual bolts which secure fish plate 18 to the adjacent ends of two rails 19. In this application of the lock it will be provided with notches 11 corresponding in number and spacing to the bolt holes in the fish plate, and slot 13 and notch 14 will be so arranged that when jaw 15 is engaged tightly around the end of the fish plate, the bolt or rivet 16 will drop into the notch and thereby prevent longitudinal movement of the jaw on bar 10. When bar 10 is applied to fish plate 18 it is inclined upwardly so as to engage jaw 12 around the end of the plate and permit the bar to closely approach the face of the plate above the nuts. It is then rocked downwardly to engage the nuts in notches 11, and then jaw 15 is adjusted as just described. For other uses the bar will be made of the proper length and proportion so that its notch or notches 11 will register with the nut or nuts to be locked and jaws 12 and 15 will engage the edges or other suitable parts of the article to which the bar is to be attached, the bolt or rivet carrying jaw 16 being then in notch 14.

What I claim is:

A nut-lock consisting of a notched bar having an integral jaw at one end and having a longitudinally extending slot adjacent its opposite end, the slot having a depending extension at one extremity thereof, and a jaw having a support slidably engaged in the slot, the support being adapted to drop into the said extension to prevent relative longitudinal movement of the bar and jaw when the two jaws are engaged on an object.

In witness whereof I hereunto subscribe my name this 22d day of July, 1915.

EMANUEL $\overset{\text{his}}{\times}$ THOMAS.
mark.

Witness:
GEORGE M. RICE.

Copies of this patent may be obtained for five cents each, by addressing the "Commissioner of Patents, Washington, D. C."